US006920455B1

(12) United States Patent
Weschler (10) Patent No.: US 6,920,455 B1
(45) Date of Patent: Jul. 19, 2005

(54) MECHANISM AND METHOD FOR MANAGING SERVICE-SPECIFIED DATA IN A PROFILE SERVICE

(75) Inventor: Paul Weschler, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 659 days.

(21) Appl. No.: 09/315,200

(22) Filed: May 19, 1999

(51) Int. Cl.$^7$ ............................................. G06F 17/30
(52) U.S. Cl. .............. 707/100; 707/103 R; 707/103 Y; 707/103 Z; 709/227; 709/228
(58) Field of Search ................. 709/331–332, 709/227–228, 201; 707/100, 103, 200

(56) References Cited

U.S. PATENT DOCUMENTS

| | | | | |
|---|---|---|---|---|
| 5,475,819 A | * | 12/1995 | Miller et al. ............. | 395/200.3 |
| 5,832,506 A | | 11/1998 | Kuzma ....................... | 707/200 |
| 5,838,970 A | * | 11/1998 | Thomas ...................... | 395/683 |
| 6,041,347 A | * | 3/2000 | Harsham et al. ............ | 709/220 |
| 6,052,720 A | * | 4/2000 | Traversat et al. ........... | 709/220 |
| 6,151,624 A | * | 11/2000 | Teare et al. .................. | 709/217 |
| 6,157,928 A | * | 12/2000 | Spenger et al. ............. | 707/103 |
| 6,167,408 A | * | 12/2000 | Cannon et al. ............. | 707/203 |
| 6,185,555 B1 | * | 2/2001 | Sprenger et al. ............... | 707/3 |
| 6,192,405 B1 | * | 2/2001 | Bunnell ...................... | 709/225 |

OTHER PUBLICATIONS

Article Lightweight Directory Access Protocol (v3), by M. Wahl et al., Dec. 1997.
Article "Lightweight Directory Access Protocol (v3) Extensions for Dynamic Directory Services" By Y. Yaacovi et al., May 1999.

* cited by examiner

Primary Examiner—Khanh B. Pham
(74) Attorney, Agent, or Firm—Stuart T. Langley; William J. Kubida; Hogan & Hartson LLP (57) ABSTRACT

A profiling service for accessing user data. The profiling service includes a hierarchical structure of profile objects. Each profile object contains true-data attributes and meta-data attributes associated to the true-data attributes. Methods in the profiling service allow a client to access user data according to meta-data attribute settings. The true-data attributes may include the user data, or an external reference to the user data. The profile objects may also include bindings to other profile objects. Meta-data attributes can be identified with a prefix field in a meta-data value field, and methods to read and write the true and meta-data attributes may be included in the profile objects. The methods may also set an owner, an access privilege, a group, a creation time, a update time, expiration time, a trigger location, a binding flag, and an assurance level of true-data attributes. The profile objects can include profile level meta-data attributes.

53 Claims, 7 Drawing Sheets

MECHANISM AND METHOD FOR MANAGING SERVICE-SPECIFIED DATA IN A PROFILE SERVICE

BACKGROUND OF THE INVENTION

1. Field of the Invention

The present invention relates, in general, to enterprise computing systems and methods, and, more particularly, to a method and system that provides a high performance tool to integrate, store, retrieve and manage reference information about entities.

2. Relevant Background

Computer systems including business systems, entertainment systems, and personal communication systems are increasingly implemented as distributed software systems. These systems are alternatively referred to as "enterprise networks" and "enterprise computing systems". These systems include application code and data that are distributed among a variety of data structures, data processor systems, storage devices and physical locations. They are intended to serve a geographically diverse and mobile set of users. This environment is complicated because system users move about the distributed system, using different software applications to access and process data, different hardware to perform their work, and often different physical locations to work from. These trends create a difficult problem in providing a secure yet consistent environment for the users.

In general, distributed computing systems must scale well. This means that the system architecture desirably adapts to more users, more applications, more data, and more geographical distribution of the users, applications, and data. The cost in money and time to switch over a network architecture that is adapted to a smaller business to one suited for a larger business is often prohibitive.

A conventional computing system uses a client/server model implemented on a local area network (LAN). In such systems powerful server computers (e.g., application servers and file servers) are used to process and access data. The requested data is then transmitted to the client computer for further processing. To scale to larger networks, multiple LANs may be internetworked using, for example, leased data lines to create a wide area network (WAN). The equipment required to implement a WAN is expensive and difficult to administer. Also, as networks become larger to include multiple LANs and multiple servers on each LAN it becomes increasingly difficult to find resources (i.e., files, applications, and users) on any one of the LANs.

As computing power continues to become less expensive, clients tend to process and store their own data, using the server primarily as file servers for sharing data with other client computers. Each software application running on the client, or the client's operating system (OS) may save client-specific configuration data that is used by the client to fine-tune and define the user's software environment at runtime.

As used herein, the term "profile information" refers to any information or meta-data used by a particular piece of hardware, software application, or operating system to configure a computer. The profile information may be associated with a particular application or group of applications, a particular hardware device or group of devices, as well as a particular user or group of users. Some operating systems store user profile information that is used during boot operations application start-up, to tailor a limited number of the system characteristics to a particular machine user. However, this profile information is closely tied to a single machine and operating system. As a result, the profile information is not useful to a new user the first time that user logs onto a particular machine. Moreover, this information is not available to remote users that are accessing the LAN/WAN using remote access mechanisms.

Existing mechanisms tend to focus on a single type of profile information—user information or application information or hardware information. Also, because these mechanisms are very application specific they limit the number and type of attributes that can be retained. Further, the profile information is isolated and fails to indicate any hierarchical or relational order to the attributes. For example, it may be desirable that a user group is required to store all files created using a particular application suite to a specific file server. Existing systems, if such a service is available at all, must duplicate profile information in each application program merely to implement the required file storage location preference. Storage location direction based on a user-by-user or user group basis is difficult to implement and may in fact require a shell application running on top of the application suite. Even then, the system is not extensible to access, retrieve, and use profile information for a new user that has not used a particular machine before.

As in the example above, existing systems for storing configuration information lead to duplicative information stored in many locations. Each application stores a copy of its own configuration information, as does each hardware device and each user. Much of this information is identical. It is difficult to maintain consistency among these many copies. For example, when the specified file storage location changes, each copy of the configuration information must be changed. The user or system administrator must manually track the location and content of each configuration file. An example of the inefficiencies of these types of systems is found in the Windows 95 registry file that holds profile information but has an acknowledged tendency to bloat over time with duplicative and unused data. Moreover, the registry file in such systems is so closely tied to a particular machine and instance of an operating system that it cannot be remotely accessed and used to configure other computers or devices. Hence, these systems are not generally extensible to manage multiple types of profile information using a single mechanism. A need exists for profile information that is readily accessible to all machines coupled to a network and to machines accessing the network through remote access mechanisms.

Another complicating influence is that networks are becoming increasingly heterogeneous on many fronts. Network users, software, hardware, and geographic boundaries are continuously changing and becoming more varied. For example, a single computer may have multiple users, each of which work more efficiently if the computer is configured to meet their needs. Conversely, a single user may access a network using multiple devices such as a workstation, a mobile computer, a handheld computer, or a data appliance such as a cellular phone or the like. A user may, for example, use a full featured e-mail application to access e-mail while working from a workstation but prefer a more compact application to access the same data when using a handheld computer or cellular phone. In each case, the network desirably adapts to the changed conditions with minimal user intervention.

In order to support mobile users, the network had to provide a gateway for remote access. Typically this was provided by a remote access server coupled to a modem.

Remote users would dial up the modem, comply with authorization/authentication procedures enforced by the server, then gain access to the network. In operation the mobile user's machine becomes like a "dumb terminal" that displays information provided to it over the dial-up connection, but does not itself process data. For example, a word processing program is actually executing on the remote access server, and the remote user's machine merely displays a copy of the graphical user interface to the remote user. The remote user is forced to use the configuration settings and computing environment implemented by the remote access server. A need exists for a method and system for remote access that enables the remote user to process data on the remote machine without being confined to using configuration settings imposed by a remote access server.

Attributes of such a heterogeneous environment, however, are difficult to manage for a single data structure. For example, profile information may be controlled by or owned by any number of a variety of entities, such that a user may own profile information related to that user's preferences, passwords, and the like. However, a workgroup administrator may own profile information related to group membership, group security policies, and the like. Further still, individual applications may own profile information describing that application's configuration operations. In an environment where any entity can change the information contained in any profile that it owns at any time, it quickly becomes an intractable problem to integrate profile information into a single directory structure. A need exists for a system and methods for maintaining profile information owned by a diverse set of entities in a heterogeneous environment.

From a network user's perspective these limitations boil down to a requirement to manually configure a given computer to provide the user's desired computing environment. From a remote user's perspective these limitations require the user to manually reconfigure the remote access computer to mimic the desired computing environment or tolerate the generic environment provided by default by the remote access server. From a network administrator's perspective, these complications require software and operating systems to be custom configured upon installation to provide the desired computing environment. In each case, the time and effort consumed simply to get "up and running" is a significant impediment to efficient use of the distributed computing environment. What is needed is a system that readily adapts to a changing, heterogeneous needs of a distributed network computing environment.

One solution to the problem of finding resources in a distributed system is to use directories. Directories are data structures that hold information such as mail address book information, printer locations, public key infrastructure (PKI) information, and the like. Because of the range of functions and different needs of driving applications, most organizations end up with many different, disparate directories. These directories do not interact with each other and so contain duplicative information and are difficult to consistently maintain.

Meta-directories are a solution that provides directory integration to unify and centrally manage disparate directories within an enterprise. A meta-directory product is intended to provide seamless integration of the multiple disparate directories. However, existing solutions fall short of this seamless integration because the problems to be solved in directory integration are complex. Existing meta-directory solutions tend to require significant up front configuration effort to account for these complexities. Also, a meta-directory product must be aware of the data format for each of the data structures that is supposed to integrate. This required knowledge makes meta-directories difficult to maintain in a computing environment that is rapidly changing. As a result, meta-directory solutions are not sufficiently extensible to account for the wide variety of resources available on a distributed network. In the past, meta-directory technology has not been used to catalog meta-data of sufficiently general nature to meet the needs of a dynamically growing and changing distributed computing environment.

Directory and meta-directory structures handle only a finite range of data types and cannot be extended unless the developer has a prior knowledge about how the program will be extended. A need exists for a directory access mechanism in which information about the data is coupled with the data itself in a manner that enables expansion.

SUMMARY OF THE INVENTION

Briefly stated, the present invention involves a profiling service for accessing user data. The profiling service includes a plurality of profile objects containing at least one true-data attribute. The true-data attribute includes a true-data key and at least one true-data value field. At least one meta-data attribute is associated with the true-data attribute, and includes a meta-data key and at least one meta-data value field. Methods within each profile object access the user data according to the meta-data attribute.

The true-data attribute may include the user data, or an external reference to the user data. The profile object may include at least one true-data attribute binding to another one of the profile objects. The meta-data key can be equated with the true-data key. Furthermore, the meta-data attribute can be identified with a prefix field in the meta-data value field. The methods to read and write the true and meta-data attributes may be included in the profile object. The methods may also set an owner, an access privilege, a group, a creation time, a update time, expiration time, a trigger location, a binding flag, and an assurance level of the true-data attribute. The profile service may include at least one profile level meta-data attribute.

DETAILED DESCRIPTION OF THE PREFERRED EMBODIMENTS

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

It is contemplated that the present invention will be particularly useful in environments that require a data structure that is quickly searched and where the data is suited to a hierarchical representation. Also, the system of the preferred implementation is optimized to store and make available relatively compact units of data that serve to configure devices and computer environments rather than operational or analytical data upon which the computer environment may operate at runtime. Hence, the present invention is best used when it stores and retrieves data that is frequently searched and retrieved, but infrequently changed.

To aid understanding several words and terms used herein to describe the present invention are defined below:

Attribute—The combination of a key related to one or more values. Frequently described as a key=value pair.

Meta-data—Special data attributes used by a Profile Service to help maintain and manage Profiles and user data within the Profiles.

Binding—A special type of attribute where the value of the key=value pair is itself a Profile. Binding one Profile to another in a chained fashion it is possible build tree structures of related profiles and attribute information (called a profile tree).

Profile—A collection of attributes related either directly or indirectly to a EntityProfile that contains data or links to data used by an entity.

EntityProfile—A collection of attributes that establish the root of a profile tree and serve as the base representation of some entity. This is the core data object around which the entire Profile Service is designed to function. In an object oriented sense an EntityProfile extends a Profile to add special functions and behavior.

ProfileList—A special type of Profile whose member attributes (with the exception of some system attributes) are themselves Profiles. In an object oriented sense a ProfileList extends a Profile to add special functions and behavior.

Profile Service—The term generally used to refer to all of the functional interfaces of Profile Service and/or an implementation of. The term is frequently used to refer specifically to the core Profile Service interface.

Profile Service Interface—The core functional interface of the Profile Service. This interface provides functions for creating, searching and removing profiles in addition to some administrative utilities.

Profile Interfaces—A term used to collectively refer to the functional interfaces of Profile, EntityProfiles and ProfileLists. These interfaces provide functions for manipulating the composition of individual Profiles.

Profile Protocol—A data transport methodology that exposes functional interfaces in a language and platform independent manner. It is a distributed communication mechanism implemented in the examples herein as extensible markup language (XML) over hypertext transfer protocol (HTTP).

Resource ID—An identifier that is constructed by the Profile Service to uniquely identify every constituent profile and attribute therein. Resource IDs have a well defined string structure.

Profile Type—A special attribute of all Profiles. This attribute is mandatory for all profiles and plays an important role in generating resource IDs and data indexing.

Entity—Entity ID—A special attribute of all EntityProfiles. This attribute plays an important role in generating resource IDs and data indexing. The Profile Service enforces the rule that all entity IDs are unique within the set of all EntityProfiles of the same type.

List Key—A special attribute of all ProfileLists. This attribute plays an important role in generating resource IDs and data indexing. The Profile Service enforces the rule that all profiles bound to a ProfileList are bound to the key such that that the ProfileLists may only have one member Profile with a specific list key value.

List Members—A term used to refer to the collection of Profiles bound to a ProfileList. Each bound profile is referred to as a member.

Figure 1:
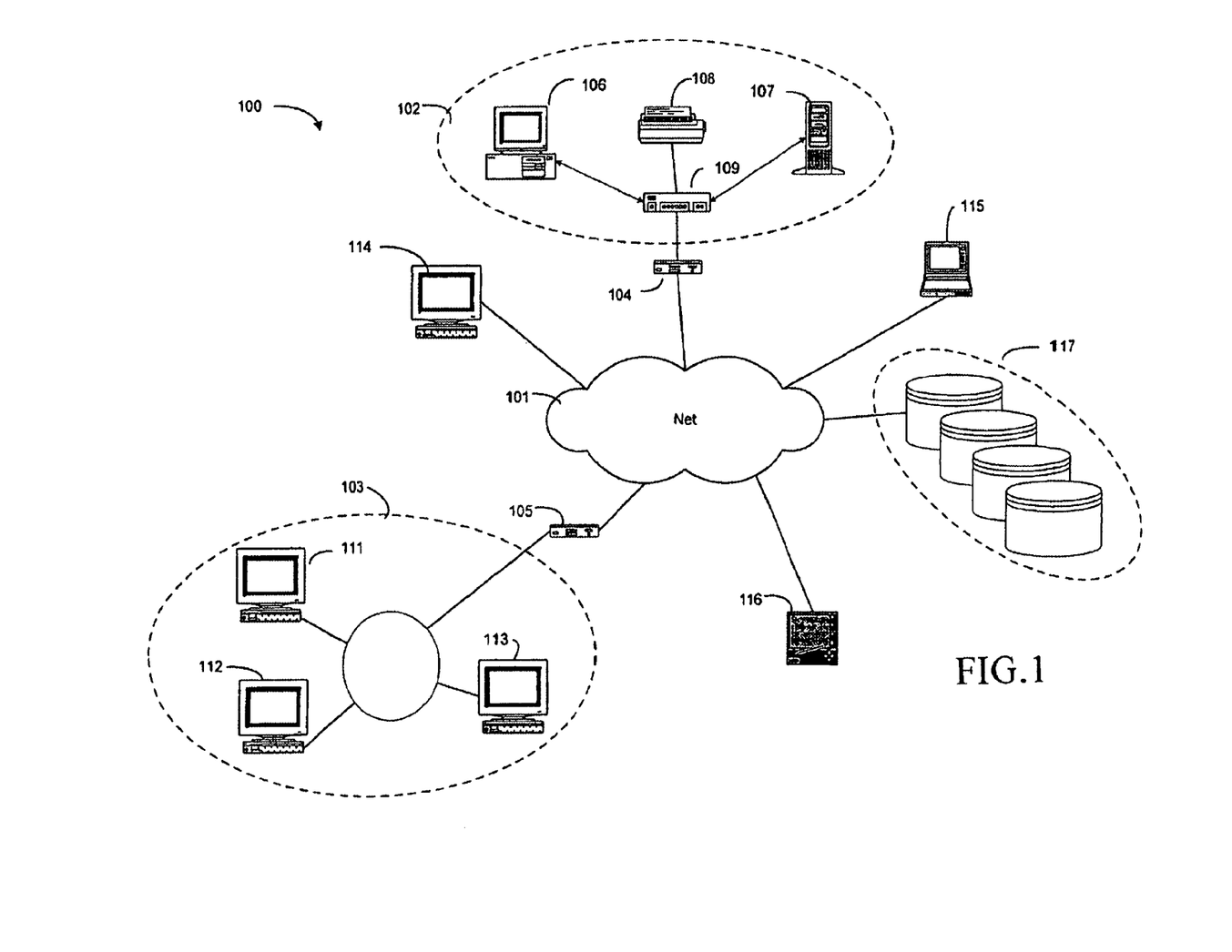
FIG. 1 illustrates an exemplary network computing environment in which the present invention is implemented.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 110 and 105 respectively. LANs 102 and 103 may be implemented using any available topology such as a hub and spoke topology of LAN 102 and a loop topology of LAN 103. LANs 102 and 103 may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the internet or another network mechanism such as a fibre channel fabric or conventional WAN technologies.

LAN 102 includes one or more workstations such as personal computer (PC) 106. LAN 102 also includes a server machine 107 and one or more shared devices such as printer 108. A hub or router 109 provides a physical connection between the various devices in LAN 102. Router 104 is coupled through gateway 109 to provide shared access to network 101. Gateway 109 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like. An important feature of the present invention is that it tolerates and adapts to an environment filled with heterogeneous hardware devices coupled to the network 101 from a variety of physical locations.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 117 that provides mass storage capacity beyond what an individual device can efficiently use and manage. Selected components of the present invention may be stored in or implemented in shared mass storage such as disk farm 117.

The computer program product devices in accordance with the present invention include elements that operate in a server such as a server 106, a client such as a workstation 111, or both. It is contemplated that elements may be stored remotely, delivered to a client system on demand by a server computer, and executed partially or completely by the server and client. Accordingly, the present invention is not limited by the methods of distribution or packaging that a particular application involves. In other words, the present invention may be distributed client-only software devices, server-only devices, or as system software that is distributed to both client and server devices.

Figure 2:
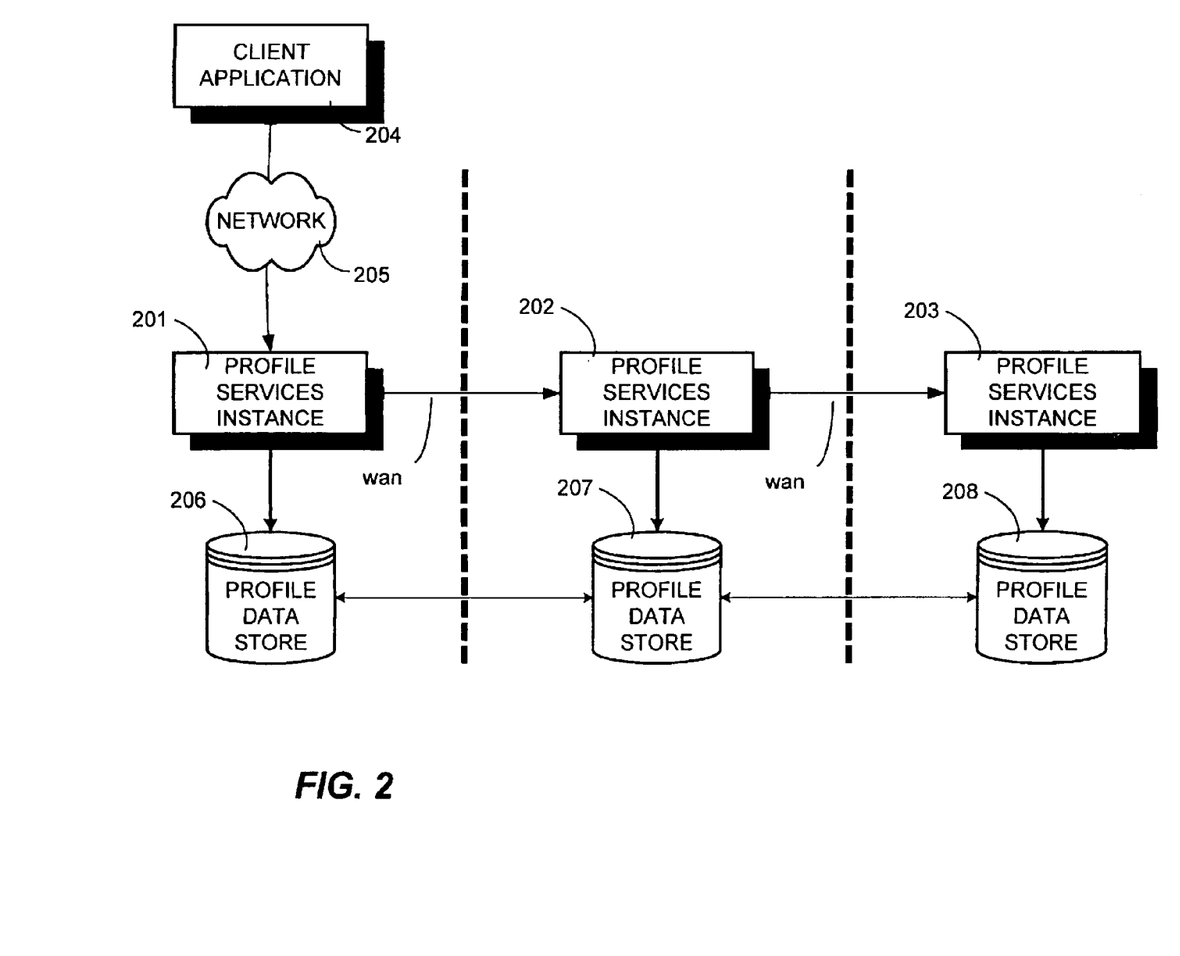
FIG. 2 shows a more specific network architecture in which in which the present invention is employed in a simple form.

FIG. 2 shows a generalized diagram of a distributed computing environment implementing the profile services in accordance with the present invention. The environment of FIG. 2 includes three profile services instances 201, 202 and 203. Each profile service instance is implemented in a separate local environment (e.g., a LAN or stand-alone environment) as suggested by the dashed vertical lines in FIG. 2. The local environments are coupled by an available WAN connection. A client application 204 accesses the profile service instance 201 to request profile services. The profile service instance 201, performs the requested service using the profile data store 206. Each profile service instance 201, 202, and 203 is associated with a data store 206, 207, and 208 respectively. The data store is local to the associated profile service instance meaning that the data store is directly accessible by the profile service without reliance on the WAN connection.

Figure 3:
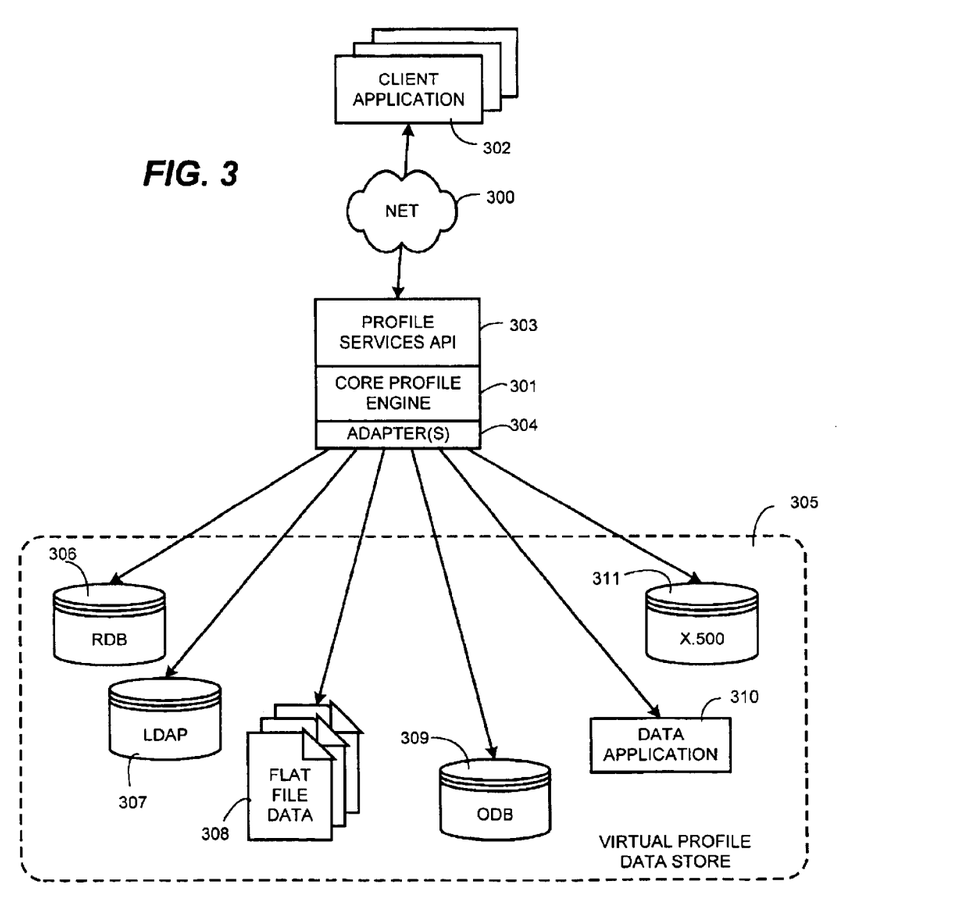
FIG. 3 shows in block diagram form significant components in a particular example of a profile service mechanism in accordance with the present invention.

FIG. 3 shows a more specific example of the present invention implemented in a gateway or firewall server such as gateway 104 or gateway 105 in FIG. 1. The components implemented in a gateway machine include a core profile engine 301 that is accessed by a client application 302 through a profile services application programming interface (API) 303. API 303 provides an interface that enables client applications that have a corresponding interface to send messages that enable the application to send data and commands to request profile services from core profile engine 301. In a particular implementation the profile services API 303 provides three basic functions. First, the profile services API 303 provides "factory" methods for creating profiles. Second, the profile services API 303 provides search and L retrieve methods for accessing existing profiles. Third, the profile services API 303 provides management utilities for defining schemas.

Core profile engine 301 responds to the client application requests by executing requested functions on virtual profile data store 305. Core profile engine 301 maintains a set of meta-data about every attribute and binding for every profile. This meta-data controls how the profile engine 301 makes the profile data available to client applications 302. This meta-data includes, but is not limited to, information regarding owner identity, read-write-modify permissions, group membership, timestamps, triggers, and the like.

Virtual profile data store 305 may comprise a single data storage device, but more often comprises a plurality of disparate, heterogeneous data storage devices. The specific example of FIG. 1 includes a relational database 306, lightweight directory access protocol 307, flat data file 308, object oriented database 309, and X.500 directory 311. An adapter 314 may also access another data application 310 where the data application 310 provides an API compatible with the adapter 314 and operates to access other local and distributed data stores. In a particular implementation, adapter(s) 314 comprise an adapter for each data store device and/or protocol. Each adapter 314 includes an interface to core profile engine 301 and a special purpose interface configured to the specific data store within virtual data store 305 that it is intended to access. Virtual data store 305 includes a dynamically changing number of data store devices as devices can be added, changed, and deleted by modifications to the associated adapter 314.

The profile service in accordance with the present invention provides a high-speed mechanism to lookup, structure and store key/value pairs. These key/value pairs represent information about "entities" such as application software, users, hardware devices, and the like. The present invention is preferably implemented as a service running on a gateway server. The present invention is Intended to integrate several physical data stores into a single, distributed logical data store of reference information.

Figures 4A, 4B:
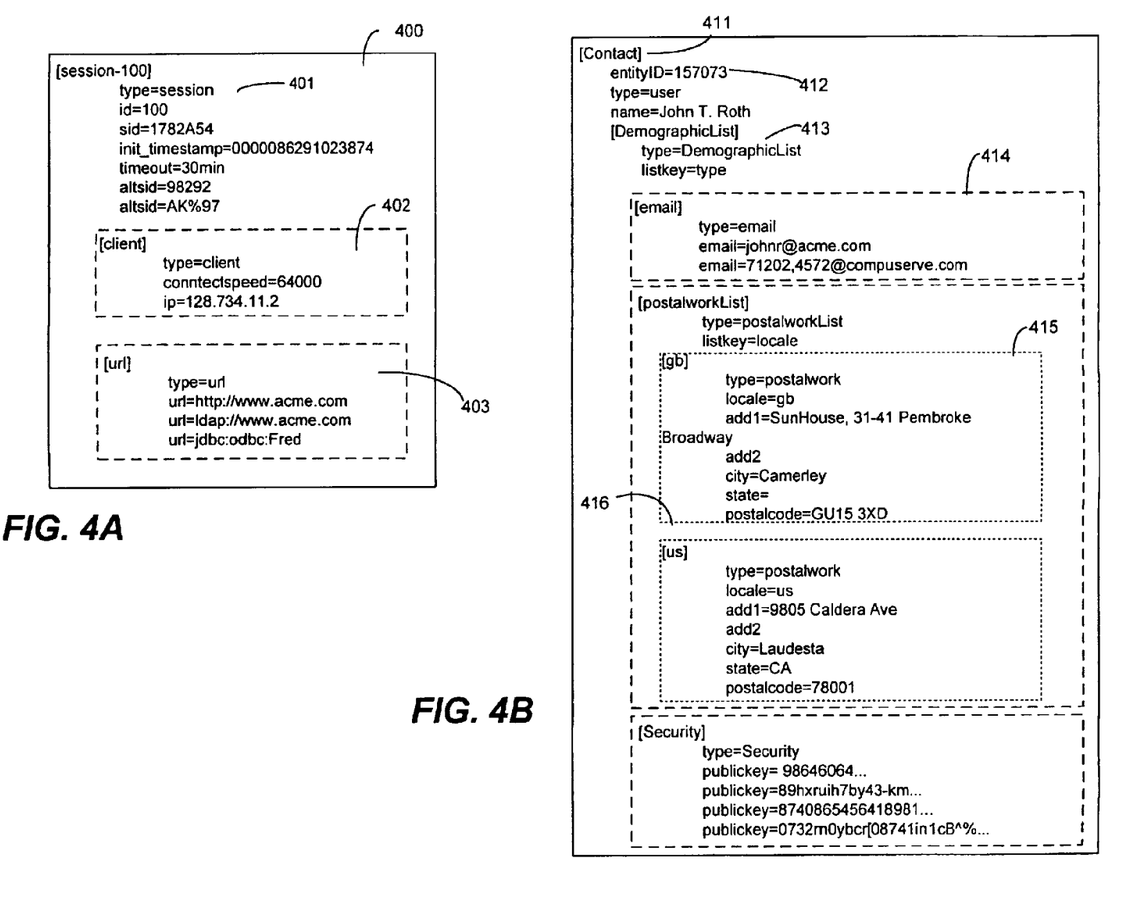
FIG. 4A and FIG. 4B show exemplary data structures for holding profile objects in accordance with the present invention.

As used herein, a "profile" is a group or set of key/value pairs, such as shown in FIG. 4A and FIG. 4B where each key/value pair is referred to as an "attribute". The value associated with a given key may be either a primitive value (e.g., a numeric value, string value, logical value, and the like) or may be another profile. When the value is another profile the value is referred to as a "sub-profile or binding" and illustrates the hierarchical nature of the present invention.

All profiles contain a type attribute. When the value of an attribute is a sub-profile, the key will be the type of the sub-profile. In the case when the value is a sub-profile the key/value pair is called a "binding". By binding several profiles it is possible to build hierarchical trees of information. It is possible to bind a profile to multiple parent profiles which is referred to herein as "linking". Linking enables the representation of relational information by creating a DAG (Directional Asyclical Graph) in addition to hierarchical information.

Profiles are not restricted in type as defined by the profile's attribute key or number of attributes that may be stored in a single profile. Moreover, individual attributes may have multiple values set as illustrated by the publickey attribute in FIG. 4B. However, each binding has only a single value, although each profile may contain any number of bindings. As described hereinafter, a user may define a schema that forces profiles of specified types to contain at least a minimum set of attributes upon creation. A schema aids in providing uniformity and a minimal level of compatibility without limiting the dynamic and extensible nature of the profiles in accordance with the present invention.

FIG. 4A shows a data structure 400 illustrating a general implementation of a profile. Data structure 400 shows a profile for a session (e.g., information about a user session on a software application, network connection, hardware device or the like). The profile service in accordance with the present invention represents and stores a special type of object called a profile in a data structure 400. As used herein, the term "object" refers to a data structure stored in mass storage or memory accessible by a computer that contains specified data and a set of methods or operations that enable the object to perform operations on the data it contains. The methods contained in an object also implement an interface enabling the object to receive data from and send data to other computer program devices. Data structure 400 is a representation of a profile object. It should be understood that the physical implementation of data structure 400 may vary significantly from application to application and may be implemented as a contiguous segment of storage locations or a dispersed arrangement of physical locations that are logically ordered in a manner shown in FIG. 4A.

An individual profile in data structure 400 comprises 0 to n attribute value pairs 401 and 0 to n subprofile bindings 402 where "n" is an arbitrary value selected to meet the needs of a particular application. In the example of FIG. 4A, profile names are enclosed by brackets [ ] and attributes 401 are represented as key=value pairs. The profile shown in FIG. 4A is named "session-100" and has a number of attributes 401 and one subprofile binding 402 to a "client profile" that comprises information about the client who initiated this session. The client subprofile in data structure 400 is also referred to as a "child" profile.

Significantly, all profiles have a "type" attribute. This attribute is set when the profile is created and is not changed. Attributes may have multiple values as does the "altsid" attribute in data structure 400. Attribute and binding keys are unique within the profile. Attribute values are either a string, another profile, or an external data reference. The attribute "ip=128.734.11.2" in data structure 400 is an example of an external data reference.

In general, when a profile is created it must be the "child" of some other profile, or it must be an "entity profile". An entity profile 411, such as shown in FIG. 4B, is a special subclass of a profile object that has an additional fixed attribute 412 called an ID. In this sense, the profile shown in FIG. 4A is not truly accurate because it is neither a child (i.e., it is not within another profile) nor an entity profile (i.e., it does not include an entityID attribute). The profile service in accordance with the present invention provides facilities for generating the ID in a manner such that all entity profiles of the same type have unique IDs. Essentially, entity profiles serve a special role of establishing roots from which other profiles may be attached. Entity profiles support all of the operations of a profile, but add additional support for some specialized method for accessing the ID attribute.

The data structure in FIG. 4B shows an entity profile "Contact" that includes a number of attributes including -a subprofile binding "DemographicList". The profile DemographicList itself contains subprofile bindings "email", "postalworkList", and "Security".

Entity profiles are used to represent data that has no single child relationship to another profile, or when no other profile exists. Entity profiles are useful to represent users, contacts, resources, components, groups, and the like. All of these entities have a discreet and meaningful independent existence and role in the real world. In contrast, conventional profiles (i.e., non-entity profiles) must always be attached as a child to either an entity profile or another non-entity profile. Non-entity profiles are useful for representing data such as display preferences, demographic information, identification information, and the like. All of these groups of information are meaningless unless related to some stand alone concept such as a user, resource, component, and the like.

PostalworkList in FIG. 4B is an example of another special profile type called a "profilelist". A profilelist relates multiple profiles of the same type to a single parent. This is done by binding a single profile list (e.g., postalworklist) to the parent (e.g., Contact) with multiple member profiles (e.g., "gb" and "us" in FIG. 4B) added to the list. While ProfileLists serve to collect profiles of the same type, it is contemplated that they may also be used as a convenient collection object for subprofiles of different types. It is important to note that profilelist member profiles contain a limited set of attributes and do not support the concept of a schema. As a result of this limitation, several profile operations are not supported by ProfileLists.

An important feature of the present invention is that profile attributes are associated with sets of meta-data attributes. For clarity, a true-data attribute is defined herein as an attribute that contains a value (e.g. data, external reference, or binding) used by a user entity or client. A meta-data attribute is defined as an attribute associated with a true-data attribute which contains information used and maintained by the core profile engine 201 (shown in FIG. 2). Meta-data attributes may also contain information associated with an entire profile, rather than an particular true-data attribute.

Figure 5A:
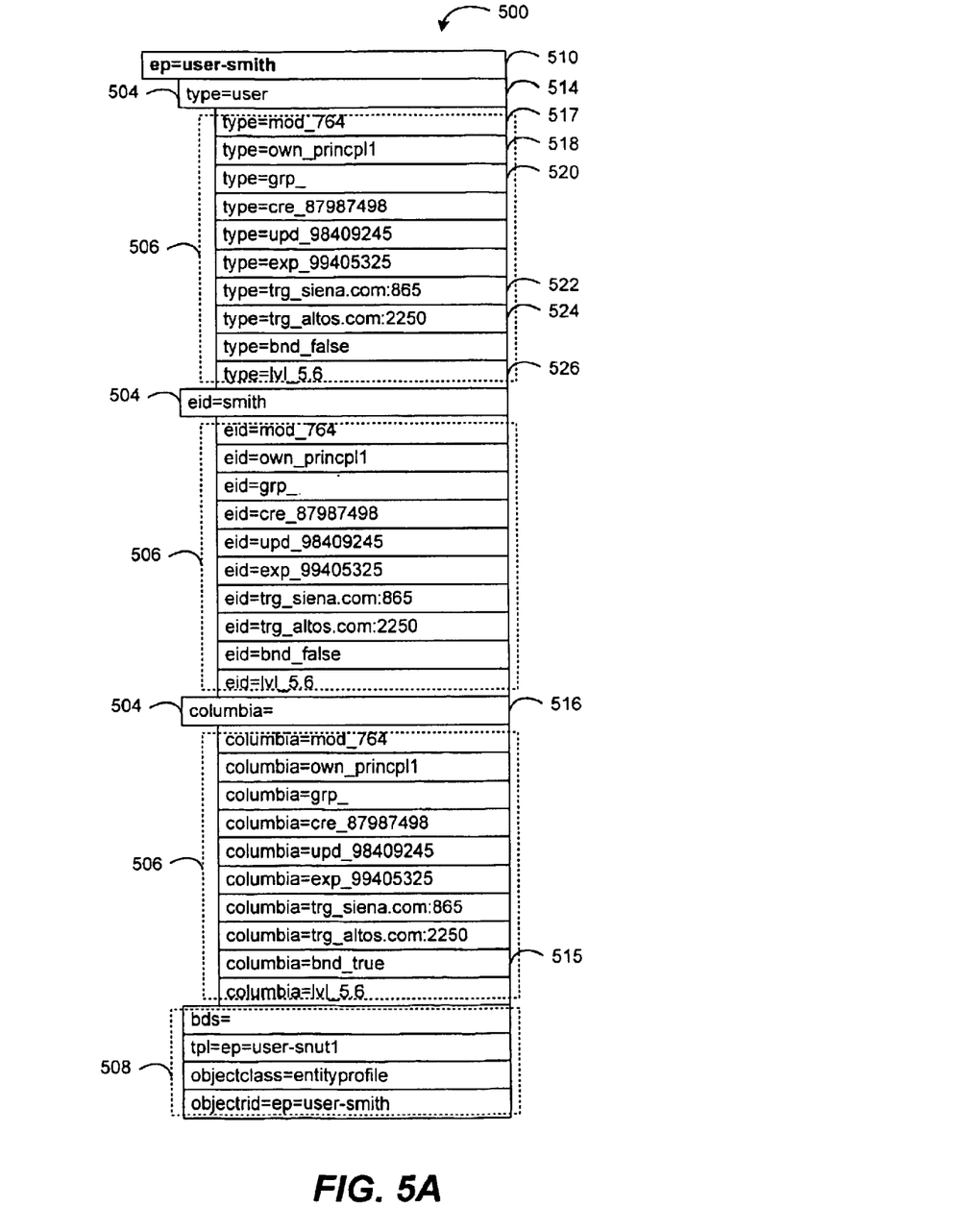
FIG. 5A and FIG. 5B show a representation of two exemplary profile objects of the present invention.
Figure 5B:
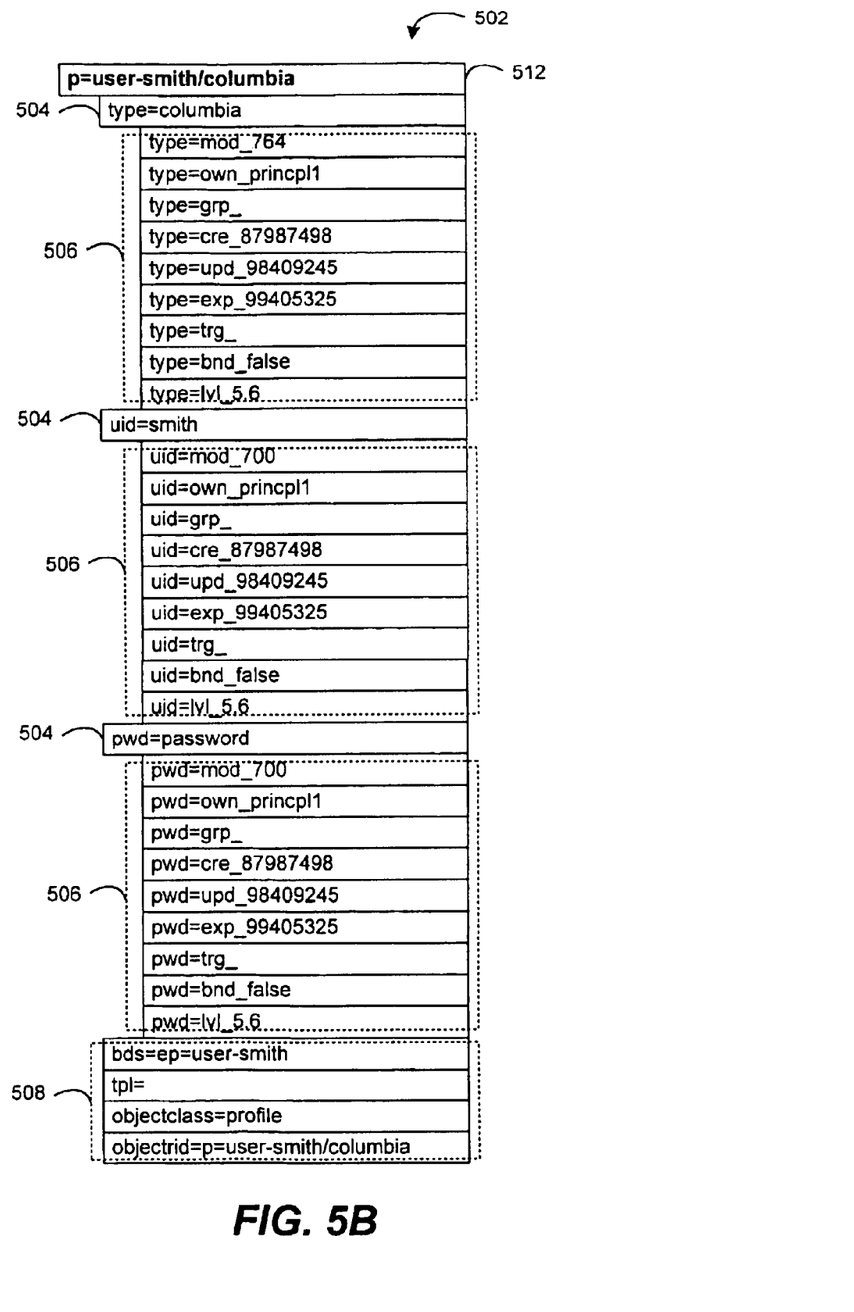

FIG. 5A and FIG. 5B show a representation of two exemplary profile objects of the present invention; an entity profile 500 and a subprofile 502. Both the entity profile 500 and the subprofile 502 include true data attributes 504 and associated meta-data attributes 506. In addition, both profiles 500 and 502 contain meta-data attributes 508 associated with each profile, and not with any particular true-data attribute. Preferably, meta-data attributes 506 and 508 are stored in the same profile object containing the associated true-data attributes 504, however, it is contemplated that meta-data attributes 506 and 508 may be stored in objects separate from the profile. By storing the meta-data attributes along side with true-data attributes, the profile service does not suffer any performance penalty when both attributes are retrieved. In addition, storing true and meta-data attributes in the same profile object keeps meta-data attributes from becoming out of sync with their associated true-data attributes.

The entity profile 500 has a profile name 510 of "user-smith" and the subprofile 502 has a profile name 512 of "user-smith/columbia". Each true-data attribute 504 contains a key=value pair holding information used by an entity. Each meta-data attribute 506 with the same key as a true-data attribute 504 is associated to the true-data attribute 504 and is created at the time the true-data attribute 504 is created. For example, in FIG. 5A and FIG. 5B, every meta-data attribute 506 with the key "type" is associated to the true-data attribute 514 "type=user". Associated meta-data attributes 506 contain information which tell the profile engine how to control the true-data attribute 504. Other meta-data attributes 508 not associated to any true-data attribute contain profile level information.

The structure of meta-data attributes is the same as the structure of true-data attributes. Each meta-data attribute contains a key=value pair. Depending on the type of data they hold, meta-data attributes may contain multiple values for the same key field. The type of information contained within a meta-data attribute 506 is identified by a known value prefix in the key=value pair. For example, the entity profile 500 contains a meta-data attribute 515 "columbia=bnd__true" associated to a true-data attribute 516 "columbia=". Since the prefix "bnd__" of the meta-data attribute 515 is set to "true", the associated true-data attribute 516 is identified as a binding to a subprofile 502. Table 1 describes the prefix values of associated meta-data attributes 506 shown in FIG. 5A and FIG. 5B. It should be noted that Table 1 is not meant as an exhaustive list of meta-data prefix values contemplated by the present invention.

TABLE 1

| Prefix | Meta-data | User Settable | Constraints | Default Value |
|---|---|---|---|---|
| mod_ | Mode | X | Any valid Unix file permission | 764 |
| own_ | Owner | X | Must be a string | The entity ID of the user creating the attribute |
| grp_ | Group | X | Must be a string | none |
| cre_ | Creation timestamp | | NA | The time at which the value was set |
| upd_ | Last update timestamp | | NA | The last time a value was set |
| exp_ | Expiration timestamp | X | No greater than 7 years from the current time | 7 days from the initial creation of the attribute |
| trg_ | Triggers | X | Must be in a format understood by the enabled notification mechanism | none |
| xrf_ | External data reference | | NA | none |
| bnd_ | Bind flag | X | Must be either true or false | false |
| lvl_ | Assurance level | | NA | none |

The mode meta-data attribute 517 (mod_) provides a data level access control mechanism and in a particular example is analogous to the Solaris™ or Unix file permissions. Solaris is a trademark or registered trademark of Sun Microsystems, Inc. in the United States and other countries. For example, in the mode meta-data field the first digit after the mod_ prefix indicates owner privileges, the second digit indicates group privileges, and the third digit represent world privileges. Each digit are allowed to have a value that is any combination (e.g., sum) of read(4), write(2), execute (1) and none(0) following Unix file permission methodology. A value of "7" indicates read, write, and execute privileges whereas a value of "4" indicates read only, a value of 3 indicates write and execute only, and the like. This encoding mechanism is provided by way of example only and other equivalent permission encoding schemes may be equivalently substituted to meet the needs of the profile service environment. In this manner the meta-data storage feature described hereinbefore enables an owner and group membership to be specified for every attribute and binding within a profile. Access permissions can be specified on an attribute and binding basis for the specified owner, group and world. This feature of the present invention provides a powerful tool for both sharing information within a profile while controlling the information that is shared with other systems and users.

For example, the profile service can be used to create a plurality of entity profiles where each entity profile corresponds to a workgroup in an organization (e.g., the entity profile type is set to "group"). Each group is allowed to contain a reference to another group or some other entity having an entity profile. In this example, each entity profile representing a group has its permissions set to "744" such that the owner has read, write, and execute privileges, while the group members and world have read only privileges. The owner of the group profile is separately specified in the owner meta-data field, and may be an individual, software application, or a plug in group service that is added on to the core profile service engine.

In this manner, the attributes stored in each of the group entity profiles may be read by any entity in an enterprise. Other users, other software applications, and other instances of the profile service can read the profile data and create enterprise wide unique ID's for profiles so long as that other entity can connect to the profile service maintaining the group entity profiles. However, only the specified owner can modify the group entity profiles.

In another example a user service has standardized the definition of "Users" by creating an entity profile of the type "user". This service sets the mode on each attribute of the User profile to "744" so that user profiles as they are defined are read only unless the user service itself accesses the profile as the owner of the attribute. Significantly, the 744 mode designation applies only to attributes created by the user service that initially created the profile. A subsequent entity can add additional attributes, including bindings to subprofiles, to the profile without breaking the 744 access control rules. These added attributes can be created with a new specified owner and new permissions. In other words, attributes and bindings within a single profile may have multiple owners and multiple permissions. For example, by specifying the permissions on the added attributes as "600" the owner of the new attributes can read and write the new attributes even though the owner has no write permission to the original attributes in the profile. Essentially, no other entity can see that the original profile has been extended. This example demonstrates the dynamic extensibility of the profile service in accordance with the present invention. Although this dynamic extensibility feature is desirably activated, it can be deactivated by a profile owner.

In yet another example, a user desires to share access to data and/or application software (referred to herein as the limited access data and/or software) with a select set of other entities. To enable this information to be exclusively shared with the desired entities, the user creates an entity profile for herself where the entity profile includes a subprofile (e.g., "users") that contains attributes needed to access the limited access data and/or software. The user then defines a group of authorized entities and sets the group meta-data entry for the user subprofile binding to the defined group. By setting the permission for this subprofile binding to "640" the authorized group will have read privileges for the limited access data and/or software. The subprofile is invisible to all but the limited access data and/or software and entities that are members of the defined group. However, members of the group can now read the user profile extensions to enable exclusive access to the limited access data and/or software application.

To understand the power of these examples it is important to note once again that an entity may be a human user, another software application, hardware device, or the like. It may be intended that the limited access data and/or software of the latter example be accessible to one suite of application software while not available to other application software. In such a case the defined group comprises the authorized application software. More specifically, the limited access data may represent bank account numbers or the like that should only be accessible to applications that provide suitable security. The bank account numbers can be made accessible to email or web browser applications that enforce the required security, while made unavailable to corresponding applications that fail to supply the required security protocols. Remaining portions of the user profile can be made available to both types of email applications making the shared information readily accessible.

It is contemplated that the owner and group entities are specified in meta-data attributes. For example, in FIG. 5A, the true-data attribute 514 has an owner value equal to "principal" set by meta-data attribute 518. The group value of meta-data attribute 520 is not specified, indicating the true-data attribute 514 has no group assigned to it. In one embodiment of the invention, the owner and group values are set by the core profile engine. The default value for the owner value is typically set to the entity ID of the user creating the true-data attribute. The default value for the group value is typically set to an empty value. In an alternative embodiment of the present invention, the owner and group entity values can be set by an authorizing service which interfaces with the core profile engine. Such an authorization service may support enterprise level access control enforcement by authorizing and authenticating user entities. Once the entity ID is established, the authorization service can report the entity ID to the profile service engine to record.

Meta-data attributes relating creation time and update time of true-data attributes are used to maintain data integrity of the profile service. The core profile engine timestamps true-data attributes with a creation time and an update time stored in meta-data attributes. The timestamps are preferably based on a single time zone reference, e.g. Greenwich mean time, such that various entities physically located in several time zones are synchronized. This enables entities to identify and retrieve the most recently updated true-data attribute. In a particular implementation, timestamps are stored as "stringified" long values such that they are readily converted to date objects in a computing environment such as the Java™ computing environment. Java is a trademark or registered trademark of Sun Microsystems, Inc. in the United States and other countries.

Each true-data attribute may also be with an expiration time. An expiration time helps eliminate data from the profile service which has become obsolete. It is contemplated that the profile service contains an aging process which continuously scans the system data base and purges expired attributes. In this manner, the profile system continuously cleans house by removing unused attributes which may otherwise clutter the profile services data structures. In a particular embodiment, the default expiration time is seven days, and the default maximum time is seven years. If the default mode or expiration is not a value that is desired, users are able to change the default value assuming the user has execute permission on that attribute or binding. If expiration longer than the default maximum of seven years is desired the attribute's creator will have to arrange to update the attribute before the expiration.

A true-data attribute may also be associated with one or more trigger values. It is contemplated that a notification service may receive the trigger values whenever the true-data attribute is changed or deleted. These trigger values are used to alert a entity referenced by the trigger values that the true-data attribute has been modified. For example, in a more specific embodiment, trigger values contain one or more URL (Uniform Resource Locator) addresses used to alert an entity when data has been changed or deleted. In FIG. 5A, meta-data attributes 522 and 524 contain URL locations of entities to be notified whenever true-data attribute 514 is modified or deleted. It is contemplated that the notification service can function asynchronously relative the core profile engine. Additionally, other notification attributes may be utilized in the present invention, such as Java Remote Method Invocation (RMI) protocol.

The present invention may also support meta-data assurance level values set by an authorization service module. The assurance level can be an arbitrary floating point scale set by the authorization service to denote the confidence level that an entity is actually who it says it is. In this manner, profile access privileges can be limited to entities that return an assurance level equal to or greater than the recorded profile meta-data assurance level. In FIG. 5A, meta-data attribute 526 associates an assurance level of 5.6 to the true-data attribute 514.

As previously mentioned, some meta-data attributes are associated to an entire profile rather than an individual true-data attribute of the profile. These control attributes 508 are identified by reserved keys in the key=value pair in FIG. 5A and FIG. 5B. Table 2 describes the set of profile control attributes 508 shown in FIG. 5A and FIG. 5B. For example, the "bds" key specifies the profiles which the current profile is bound to, the "tpl" key helps maintain profile uniformity by specifying one or more templates, the "objectclass" key identifies the profile class, and the "objectrid" key identifies the profile object resource ID.

TABLE 2

| Key Value | Multiple values | Description |
|---|---|---|
| bds | yes | Records the profile resource ID this profile is bound to. |
| tpl | yes | Records profile resource IDs of templates associated with this profile. |
| objectclass | no | Records a value indicating type of profile represented. |
| objectrid | no | Records the resource ID for the profile. |

Figures 6A, 6B:
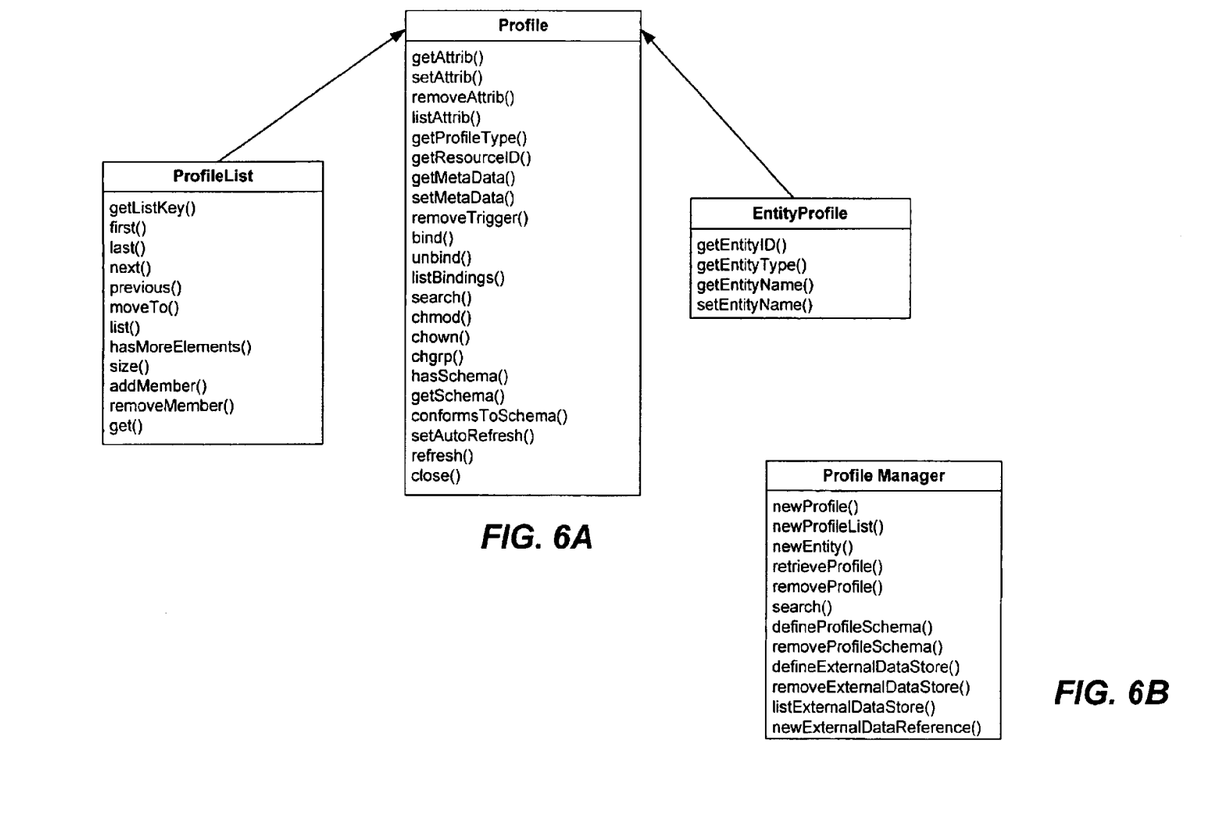
FIG. 6A and FIG. 6B show class structure and relationships between classes used in an exemplary embodiment of the present invention.

FIG. 6A and FIG. 6B illustrate an exemplary class structure indicating basic functional objects and characteristics of a profile service in accordance with the present invention. The profile service supports two basic functional objects, profiles themselves and a "profile manager". The profile manger interface is alternatively referred to as the profile service interface. The logical interfaces shown in FIG. 6A and FIG. 6B are not intended to be literal. Instead they are intended to articulate the fundamental functional operations that the service supports. All implementation of the profile service desirably support these classes of functions. In addition, individual implementations may support additional methods that are not supported in all implementations to meet the needs of a particular application.

A profile class includes variables, data and methods necessary to define basic functional interfaces of general profiles described hereinbefore. In particular, profile class methods include a method for retrieving and creating true-data attribute information (getAttrib and setAttrib). The profile class also includes a method for looking at the contents of meta-data attributes (getMetaData), a method for creating meta-data attributes (setMetaData), a method for removing a trigger value (removeTrigger), a method for creating a subprofile binding (bind), a method for removing a binding (unbind), a method for changing attribute access privileges (chmod), methods to change an attribute's owner and group (chown and chgrp), and methods of checking a profile's template settings (hasSchema, getSchema, and conformsToSchema). The basic operation of some of the Profile class methods is summarized in Table 3.

TABLE 3

| Method | Operation Summary |
| --- | --- |
| getAttrib | Given a true-data attribute key, the getAttrib method will return the value of the true-data attribute. |
| setAttrib | Given a true-data attribute key and an attribute value the setAttrib method sets an attribute on a profile, where key = value. |
| removeAttrib | Given a true-data attribute key and value, removes a specified attribute value from a profile. If no attribute value is set, the entire attribute is removed. An entity must have execute privilege to perform this operation. |
| listAttrib | Returns a list of true-data attributes which exist on a profile. |
| getProfileType | Returns a profile's object class type. |
| getResourceID | Returns a profile's resource ID value. |
| getMetaData | Given a meta-data attribute key and a value prefix index, returns the value of the meta-data attribute. |
| setMetaData | Given a meta-data attribute key and value, sets the attribute on the profile where key = value. |
| removeTrigger | Removes a specified trigger from a profile's trigger meta-data attribute. |
| bind | Established a parent child relationship between a first profile and a second profile (the child). Essentially, an attribute is established in the first profile pointing a subprofile. |
| unbind | Causes a profile binding to be removed. |
| listBindings | Lists the profiles bound to a profile. |
| search | Returns all the true-data attributes that match specified filters relative to a profile. |
| chmod | Given a true-data attribute key, changes the attribute's access privileges. In order to execute this method, the caller must have execute privilege on the attribute. |
| chown | Changes the owner of a true-data attribute. In order to execute this method, the caller must be the current owner of this attribute and have execute privilege. |
| chgrp | Changes the group of a true-data attribute. In order to execute this method, the caller must be the attribute's current owner or a member of its group and have execute privilege. |
| hasSchema | Determines if a profile is associated to one or more templates. |
| getSchema | Returns a profile template's required attributes. |
| conformsToSchema | Returns a true or false depending on whether or not a profile conforms to its templates. |
| setAutoRefresh | Sets the automatic refresh state of a profile. Automatic refreshing of a profile causes the profile to be synchronized with all other instances of the profile. This |

TABLE 3-continued

| Method | Operation Summary |
| --- | --- |
|  | feature ensures that users are immediately seeing the changes made by other users. |
| refresh | Explicitly forces a profile to synchronize with a master data record. Any changes to the master record and all updates performed by other users on the master record will be reflected in the profile |
| close | Closes a profile and releases any resources it may have had. |

The entity profile class includes variables, data and methods necessary to define basic functional interfaces of entity profiles described hereinbefore. In the specific example of FIG. 6A the entity profile class extends the profile interface (i.e., it supports all the methods found in the profile interface) by providing several methods that are specific to entity profiles. Table 4 summarizes these special methods.

TABLE 4

| Method | Operation Summary |
| --- | --- |
| getEntityID | Returns the entity ID of a specified entity profile. |
| getEntityType | Returns the value of the type attribute of a specified entity profile. |
| getEntityName | Sets the value of the name attribute of a specified entity profile. |
| getEntityName | Returns the value of the name attribute of a specified entity profile. |

The profile list class includes variables, data and methods necessary to define basic functional interfaces of profile lists described hereinbefore. The profile list class also extends the profile interface and provides additional methods used to look at and manipulate the contents of a profile list. Table 5 summarizes operation of the components of a Profile list object shown in FIG. 6A.

TABLE 5

| Method | Operation Summary |
| --- | --- |
| getListKey | Returns the key to a list. All members of a list contain an attribute reference by a list key and no two members have the same value assigned to this key. |
| first | Moves the list index to the first member profile in the list |
| last | Moves the list index to the last member profile in the list |
| next | Moves the list index to the next member profile in the list. |
| previous | Moves the list index to the previous member profile in the list. |
| moveTo | Moves the list index to a member profile with a specified key value. |
| list | Returns a list's profiles members. |
| hasMoreElements | Indicates whether a profile list has more elements based on the current position of the list index. |
| size | Returns the number of members currently in the profile list. |
| addMember | Adds a specified profile to the list membership. |
| removeMember | Removes a profile associated with a specified key from the list membership. |

TABLE 5-continued

| Method | Operation Summary |
| --- | --- |
| get | Returns the profile at the current list index. The caller must have read privilege on the profile member. |

The functions described in Tables 3–5 are representative only and it is contemplated that the profile, entity profile, and profile list classes will implement a variety of other methods to meet the needs of a particular application. The specific methods and interfaces identified herein can be implemented in any available object-oriented programming environment such as, for example, SmallTalk, C++, Java, and the like.

FIG. 6B shows a Profile service class implementing the profile service interface to profile methods for creating and retrieving profiles. Table 6 summarizes important methods implemented in the profile service interface.

TABLE 6

| Method | Operation Summary |
| --- | --- |
| newProfile | Given a set of initializing criteria, the method creates a new profile. |
| newProfileList | Given a set of initializing criteria, the method creates a new profile list. |
| newEntity | Given a set of initializing criteria, the method creates a new entity profile. |
| retrieveProfile | Retrieves a profile with a specified resource ID. |
| removeProfile | Removes an profile with a specified resource ID. If the profile is referenced by other profiles, the removed profile will simply be relocated and assigned a new resource ID. |
| search | Given a search expression the search method returns a list of subprofiles and/or attribute values of a profile that match the given search expression. This method can search all profiles. |
| defineProfileSchema | Creates a template which defines what a profile should look like. |
| removeProfileSchema | Removes a template definition from a profile. |
| defineExternalDataStore | Defines a new external data store for integration into the profile service virtual data store. |
| removeExternalDataStore | Removes a specified external data store definition. |
| listExternalDataStore | Returns a list comprised of all the external data store resource IDs currently defined. |
| newExternalDataStore | Creates a new external data reference object that can be assigned to the value of any attribute. |

Optionally, profile service engine 301 includes an interface for communicating with other services. Examples of such services include an authorization service that supports enterprise level access control enforcement by authorizing and authenticating user entities. Another example is a group service that provides a mechanism for defining and maintaining group entity profiles. This enables the profile service in accordance with the present invention to dynamically integrate functionality as new services and software applications become available that can communicate with the provided optional interface.

It will be appreciated that the profile service described herein provides generic profiling capability and defines the fundamental behavior, representation, and functional interfaces for profile objects. In addition, data replication between instances of the profile services are integrated. The generic capabilities described herein enable the definition of data structures to occur independently of and after, a core profile is created and defined. This dynamic extensibility yields a product of wide ranging utility.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for managing a profile service, the method comprising:

storing at least one true-data attribute in a profile object, said true-data attribute includes a true-data key and at least one true-data value field;

associating at least one meta-data attribute with said true-data attribute, said meta-data attribute includes a meta-data key and at least one meta-data value field, wherein the meta-data value field describes the associated true-data attribute;

storing said associated meta-data attribute in said profile object; and managing said true-data attribute according to said associated meta-data attribute.

2. The method as defined in claim 1, wherein the method further includes indicating in said meta-data attribute an access privilege of said true-data attribute.

3. The method as defined in claim 1, wherein the method further includes indicating in said meta-data attribute an owner of said true-data attribute.

4. The method as defined in claim 1, wherein the method further includes indicating in said meta-data attribute a group of said true-data attribute.

5. The method as defined in claim 1, wherein the method further includes indicating in said meta-data attribute a creation time of said true-data attribute.

6. The method as defined in claim 1, wherein the method further includes indicating in said meta-data attribute a update time of said true-data attribute.

7. The method as defined in claim 1, wherein the method further includes indicating in said meta-data attribute a expiration time of said true-data attribute.

8. The method as defined in claim 7, wherein the method further includes;

identifying said true-data attribute with said expiration time beyond a profile service time; and deleting said identified true-data attribute from said profile object.

9. The method as defined in claim 1, wherein the method further includes indicating in said meta-data attribute at least one trigger location of said true-data attribute.

10. The method as defined in claim 1, wherein the method further includes indicating in said meta-data attribute a binding flag of said true-data attribute.

11. The method as defined in claim 1, wherein the method further includes indicating in said meta-data attribute an assurance level of said true-data attribute.

12. The method as defined in claim 1, wherein the method further includes identifying said meta-data attribute information by a prefix field in said meta-data value field.

13. The method as defined in claim 1, wherein the method further includes:
    associating at least one profile level meta-data attribute to said profile object;
    storing said profile level meta-data attribute; and
    managing said profile object according to said associated profile meta-data attribute.

14. The method as defined in claim 13, wherein the method further includes indicating in said profile level meta-data attribute at least one template resource ID of said profile object.

15. The method as defined in claim 13, wherein the method further includes indicating in said profile level meta-data attribute an object class of said profile object.

16. The method as defined in claim 13, wherein the method further includes indicating in said profile level meta-data attribute an object ID of said profile object.

17. The method as defined in claim 13, wherein the method further includes indicating in said profile level meta-data attribute a binding resource ID of said profile object.

18. A profiling service for accessing user data, said profiling service comprising:
    a plurality of profiled objects stored in a physical medium;
    at least one true-data attribute contained in each of said profile objects, said true-data attribute includes a true-data key and at least one true-data value field;
    at least one meta-data attribute associated to said true-data attribute and contained in said profile object, said meta-data attribute includes a meta-data key and at least one meta-data value field, wherein the meta-data value field describes the associated true-data attribute; and
    methods within each profile object to access the user data according to said meta-data attribute.

19. The profile service of claim 18, wherein said true-data attribute comprises the user data.

20. The profile service of claim 18, wherein said true-data attribute comprises an external reference to the user data.

21. The profile service of claim 18, further comprising at least one true-data attribute binding to another one of said profile objects.

22. The profile service of claim 18, wherein said meta-data attribute is identified with a prefix field in said meta-data value field.

23. The profile service of claim 18, wherein said meta-data key is equated with said true-data key.

24. The profile service of claim 18, further comprising methods within said profile objects to read and write said true-data attribute.

25. The profile service of claim 18, further comprising methods within said profile objects to read and write said meta-data attribute.

26. The profile service of claim 18, further comprising methods within the profiling service to set an owner of said true-data attribute.

27. The profile service of claim 18, further comprising methods within said profile objects to set an access privilege of said true-data attribute.

28. The profile service of claim 18, further comprising methods within said profile objects to set a group of said true-data attribute.

29. The profile service of claim 18, further comprising methods within said profile objects to set a creation time of said true-data attribute.

30. The profile service of claim 18, further comprising methods within said profile objects to set a update time of said true-data attribute.

31. The profile service of claim 18, further comprising methods within said profile objects to change a expiration time of said true-data attribute.

32. The profile service of claim 31, further comprising methods within said profile objects to delete said true-data attribute with said expiration time beyond a profile service time.

33. The profile service of claim 18, further comprising methods within said profile objects to set a trigger location of said true-data attribute.

34. The profile service of claim 18, further comprising methods within said profile objects to set a binding flag of said true-data attribute.

35. The profile service of claim 18, further comprising methods within said profile objects to set an assurance level of said true-data attribute.

36. The profile service of claim 18, further comprising at least one profile level meta-data attribute.

37. The profile service of claim 36, further comprising methods within said profile objects to set a template resource ID of said profile object.

38. The profile service of claim 36, further comprising methods within said profile objects to set an object class of said profile object.

39. The profile service of claim 36, further comprising methods within said profile objects to set an object ID of said profile object.

40. The profile service of claim 36, further comprising methods within said profile objects to set a binding resource ID of said profile object.

41. A profiling service for accessing user data, said profiling service comprising:
    means for storing at least one true-data attribute in a profile object, said true-data attribute includes a true-data key and at least one true-data value field;
    means for associating at least one meta-data attribute with said true-data attribute, said meta-data attribute includes a meta-data key and at least one meta data value field, wherein the meta-data value field describes the associated true-data attribute;
    means for storing said associated meta-data attribute with said associated true-data attribute; and
    means for managing said true-data attribute according to said associated meta-data attribute.

42. A profile object stored in a physical medium for maintaining client configuration data in a hierarchical fashion, the profile object comprising:
    at least one true-data attribute in the profile object, said true-data attribute includes a true-data key and at least one true-data value field; and
    at least one meta-data attribute associated to with said true-data attribute and stored in said profile object, said meta-data attribute includes a meta-data key and at least one meta-data value field, wherein the meta-data value field describes the associated true-data attribute.

43. The profile object of claim 42, wherein said meta-data attribute specifies an access privilege of said true-data attribute.

44. The profile object of claim 42, wherein said meta-data attribute specifies a expiration time of said true-data attribute.

45. The profile object of claim 42, further including an aging method for deleting said true-data attribute with said expiration time beyond a profile service time.

46. The profile object of claim 42, wherein said meta-data attribute specifies a binding flag of said true-data attribute.

47. The profile object of claim 42, further including at least one profile level meta-data attribute associated to the profile object.

48. A computer program product comprising:
- a computer usable medium and computer readable code embodied on said computer useable medium for causing the managing of a profile service, the computer readable code comprising;
- computer readable program code configured to cause the computer to effect the storing of at least one true-data attribute in a profile object, said true-data attribute includes a true-data key and at least one true-data value field;
- computer readable program code configured to cause the computer to effect the associating of at least one meta-data attribute with said true-data attribute, said meta-data attribute includes a meta-data key and at least one meta-data value field, wherein said meta-data key is equated with said true-data key;
- computer readable program code configured to cause the computer to effect the storing of said associated meta-data attribute; and
- computer readable program code configured to cause the computer to effect the managing of said true-data attribute according to said associated meta-data attribute.

49. A computer program product embodied in a tangible media comprising:
- computer program devices readable by a data processor coupled to the tangible media for managing a plurality of profile data structures, each profile data structure comprising a hierarchical structure of true-data attributes and meta-data attributes, the computer program product comprising:
- first program code devices configured to cause the data processor to store said true-data attributes in said profile data structures, said true-data attributes include a true-data key and at least one true-data value field;
- second program code devices configured to cause the data processor to associate said meta-data attributes with said true-data attributes, said meta-data attributes include a meta-data key and at least one meta-data value field, wherein said meta-data key is equated with said true-data key;
- third program code devices configured to cause the data processor to store said associated meta-data attribute; and forth program code devices configured to cause the data processor to manage said true-data attributes according to said associated meta-data attributes.

50. The computer program product of claim 49 wherein the tangible media comprises a magnetic disk.

51. The computer program product of claim 49 wherein the tangible media comprises an optical disk.

52. The computer program product of claim 49 wherein the tangible media comprises a propagating signal.

53. The computer program product of claim 49 wherein the tangible media comprises a random access memory device.

* * * * *

UNITED STATES PATENT AND TRADEMARK OFFICE
CERTIFICATE OF CORRECTION

PATENT NO. : 6,920,455 B1
DATED : July 19, 2005
INVENTOR(S) : Paul William Weschler, Jr.

It is certified that error appears in the above-identified patent and that said Letters Patent is hereby corrected as shown below:

<u>Column 19,</u>
Line 24, "profiled" should be -- profile --.

Signed and Sealed this

Eighth Day of November, 2005

JON W. DUDAS
*Director of the United States Patent and Trademark Office*